United States Patent
Vitale et al.

(10) Patent No.: US 9,457,791 B2
(45) Date of Patent: Oct. 4, 2016

(54) CHARGING CABLE WITH CONTROLLER

(75) Inventors: Robert L. Vitale, Macomb Township, MI (US); Jonas Bereisa, Bloomfield Hills, MI (US); Raymond A. Beaufait, Macomb, MI (US); Gery J. Kissel, Northville, MI (US); Craig R. Markyvech, Romulus, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 769 days.

(21) Appl. No.: 12/349,336

(22) Filed: Jan. 6, 2009

(65) Prior Publication Data
US 2010/0174667 A1 Jul. 8, 2010

(51) Int. Cl.
| | |
|---|---|
| H02J 7/02 | (2016.01) |
| B60W 10/26 | (2006.01) |
| B60L 3/00 | (2006.01) |
| B60L 11/18 | (2006.01) |
| G06Q 50/06 | (2012.01) |
| H02J 7/00 | (2006.01) |

(52) U.S. Cl.
CPC .......... *B60W 10/26* (2013.01); *B60L 3/0069* (2013.01); *B60L 11/184* (2013.01); *B60L 11/1818* (2013.01); *B60L 11/1824* (2013.01); *B60L 11/1838* (2013.01); *B60L 11/1846* (2013.01); *G06Q 50/06* (2013.01); *B60L 2230/12* (2013.01); *B60L 2230/16* (2013.01); *H02J 7/0042* (2013.01); *Y02T 10/6269* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
USPC .................................. 320/109, 111
See application file for complete search history.

(56) References Cited

U.S. PATENT DOCUMENTS

| 6,456,041 | B1 * | 9/2002 | Terada et al. ............... 320/132 |
| 7,168,974 | B2 * | 1/2007 | Feldman et al. ............. 439/488 |
| 2004/0130292 | A1 * | 7/2004 | Buchanan et al. ........... 320/116 |
| 2008/0039989 | A1 * | 2/2008 | Pollack et al. ................ 701/22 |

OTHER PUBLICATIONS

Harper, P., Edison SmartConnect: The Path Forward. Daily Issue Alert 2008 [retrieved on Aug. 28, 2008]. Retrieved from Internet <URL:http://www.energyblogweb.com/issuealert/article.asp?id=2965&Print=True>.
Tendril Volt. Plug in to what's Plugged-In. 2008 [retrieved on Aug. 28, 2008]. Retrieved from Internet <URL:http://www.tendrilinc.com/consumers/products/volt/>.

(Continued)

Primary Examiner — Robert Grant
(74) Attorney, Agent, or Firm — Lorenz & Kopf LLP (57) ABSTRACT

A vehicle charging cable is disclosed configured to charge a vehicle battery on a vehicle from a utility power source, the cable comprising: a vehicle connector and a control module. The vehicle connector is connected to a power cable configured to supply power for charging the vehicle battery. The vehicle connector is configured to connect to a charging port on the vehicle. The control module is connected to the power cable. The control module is configured to receive utility data from the utility power source and to receive vehicle data from the vehicle, and to adjust the power supplied to the vehicle battery based on the utility data and the vehicle data.

20 Claims, 3 Drawing Sheets (56) References Cited

OTHER PUBLICATIONS

ZigBee Alliance Smart Energy Certified Products. 2008 [retrieved on Aug. 28, 2008]. Retrieved from Internet <URL:http://www.zigbee.org/en/certification/certified_products_zse.asp>.

Southern California Edison. Advanced Metering Infrastructure. Southern California Edison 2006. [Retrieved on Aug. 28, 2008]. Retrieved from Internet <URL:http://www.sce.com/ami>.

Designing the Future: A Smart Grid Newsletter Case Study, Nov. 2006. [Retrieved on Aug. 28, 2008]. Retrieved from Internet <URL:http://www.smartgridnews.com>.

Southern California Edison. Testimony supporting application for approval of advanced metering infrastructure pre-deployment activities and cost recovery mechanism, Dec. 21, 2006. Obtained on Aug. 28, 2008, vol. 1.

Woody, G. R., et al. U.S. Appl. No. 11/867,492, filed Oct. 4, 2007, entitled Power Grid Load Management for Plug-In Vehicles.

* cited by examiner

CHARGING CABLE WITH CONTROLLER

TECHNICAL FIELD

The following description generally relates to charging cables for electric and hybrid electric vehicles.

BACKGROUND

In many electric vehicles including plug-in hybrid-electric vehicles, a vehicle battery is charged from a utility power source such as a public or private outlet that receives electricity from an electric utility. A charging cable is used to connect the vehicle utility power source to the vehicle battery.

Charging cables connect a charging system in the electric vehicle to utility power. Once connected, the vehicle charging system typically begins charging the vehicle battery until the battery is completely charged. To reduce costs, a user may wait to plug in a vehicle until utility rates are reduced, such as during the night time, but this is likely to cause situations where the vehicle is not charged when the user forgets, or is unable to plug in the charging cable at the appropriate time.

Accordingly, it is desirable to provide a charging cable for convenient charging of the vehicle battery at the reduced utility rates. Furthermore, other desirable features and characteristics will become apparent from the subsequent detailed description and the appended claims, taken in conjunction with the accompanying drawings and the foregoing technical field and background.

SUMMARY

According to various exemplary embodiments, a charging cable is configured to electrically couple a vehicle battery to a utility power source, the charging cable comprising: a vehicle connector, a data module, and a control module. The vehicle connector is configured to connect to a charging port on a vehicle. The data module is configured to receive utility data from the utility power source and to receive vehicle data from the vehicle. The control module is communicatively coupled to the data module, and the control module is configured to control an electrical coupling between the utility power source and the charging port based on the utility data and the vehicle data.

Another example of a vehicle charging cable includes: a data communication system, a control system, and a user interface. The data communication system is configured to communicate with a home area network and configured to communicate with a vehicle. The control system includes a data module and a control module. The data module is communicatively coupled to the data communication system and is configured to retain utility rates, and power usage information. The control module is communicatively coupled to the data module and is configured to control an electric coupling between a utility power source and a vehicle battery. The control module calculates a charging schedule based on the utility rates and the power usage information. The user interface is configured to display the charging status of the vehicle battery, and configured to accept user input.

Another example embodiment includes a device comprising a vehicle connector and a control module. The vehicle connector is connected to a power cable configured to supply power for charging a vehicle battery. The vehicle connector is configured to connect to a vehicle with a charging port. The control module is connected to the power cable. The control module is configured to receive utility data from a utility power source and to receive vehicle data from the vehicle, and to adjust the power supplied to the vehicle battery based on the utility data and the vehicle data.

DESCRIPTION OF THE DRAWINGS

A more complete understanding of the subject matter may be derived by referring to the detailed description and claims when considered in conjunction with the following figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In an exemplary embodiment, a charging cable for an electric vehicle includes a control module that is configured to control an electric coupling in a module of the charging cable based on utility rates to achieve a lower cost for charging the electric vehicle. The exemplary charging cable may also communicate with the utility power source, such as a utility power company, to receive utility rate information, and to monitor, record, and transfer customer energy usage data to the utility power company or other recipient. In one embodiment of the charging cable, the control module in the cable determines a charging schedule for reduced charging costs according to the utility rates. The control module then directs the electric coupling to connect the vehicle for charging, or to disconnect the vehicle from the utility power source, according to the charging schedule. Details of several exemplary embodiments will now be presented with particular reference to the drawing figures.

Figure 1:
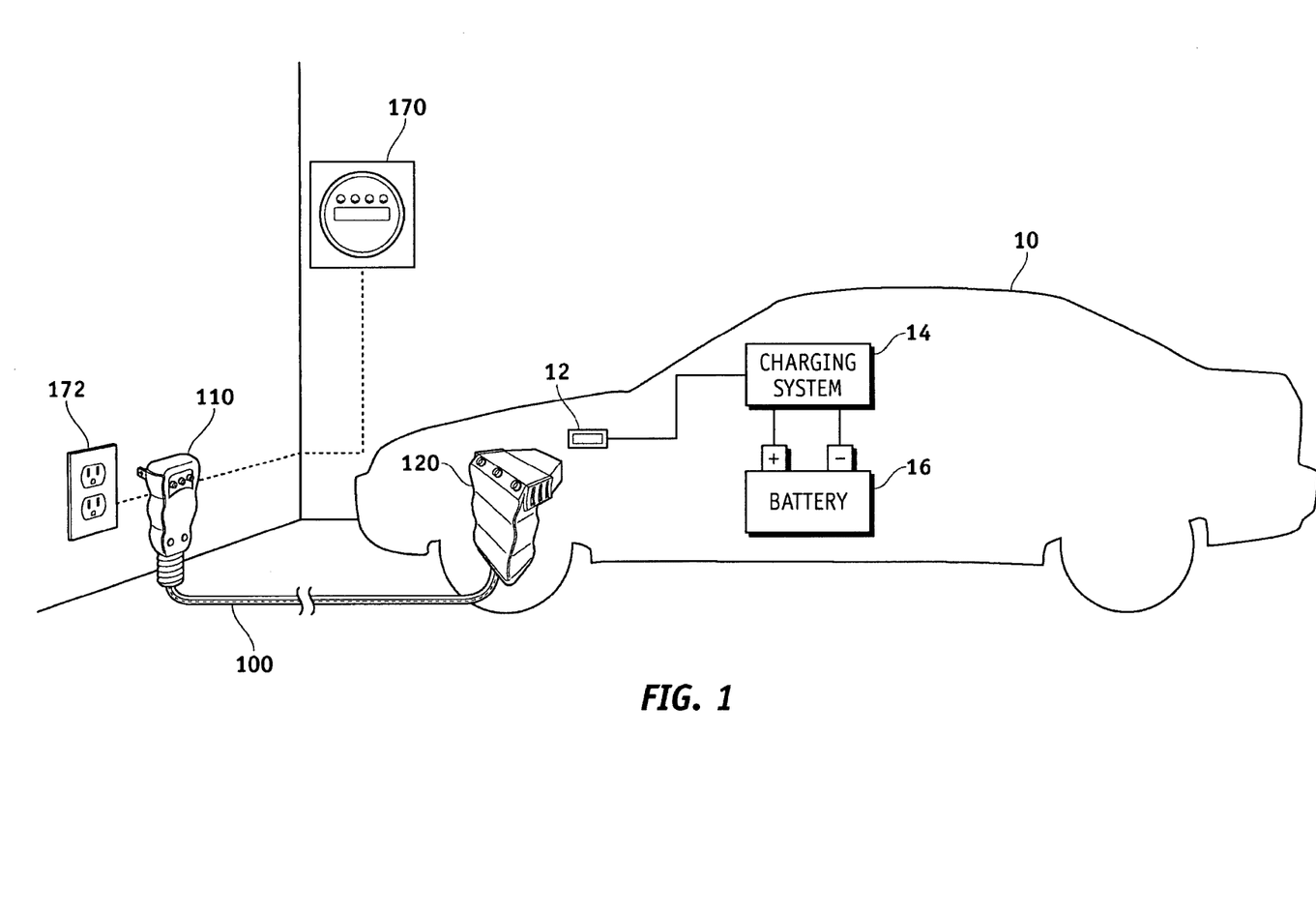
FIG. 1 is a diagram illustrating an electric vehicle and an exemplary charging cable.

FIG. 1 shows a charging cable 100 with a utility end 110 and a vehicle end 120. FIG. 1 also shows a vehicle 10 with a charging port 12, a vehicle charging system 14 and a vehicle battery 16. Vehicle 10 is illustrated in a garage with a utility power socket 172 that is connected to a utility power source 170. Vehicle 10 may be any plug-in electric vehicle, including a plug in hybrid-electric vehicle. Vehicle end 120 of charging cable 100 in the exemplary embodiment is configured to connect with charging port 12 to electrically couple vehicle charging system 14 and vehicle battery 16 to utility power source 170 when utility end 110 is connected to utility power source 170 through utility power socket 172.

Figure 2:
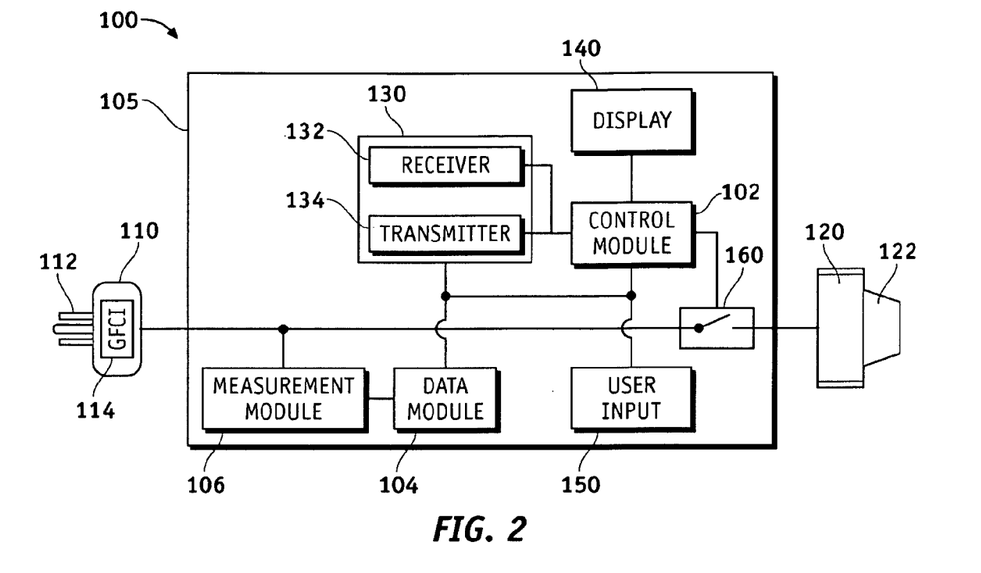
FIG. 2 is a block diagram illustrating an exemplary charging cable.

FIG. 2 shows a block diagram of an exemplary embodiment of charging cable 100 with a control system 105. In the exemplary embodiment control system includes control module 102 including a processor, a data module 104, a measurement module 106, a communication module 130 with a receiver 132 and a transmitter 134, a display module 140 with a user interface display, a user input module 150 with a user input device, and an electric coupling 160. In alternative embodiments modules may be separate from control system 105 and coupled to control system 105 as appropriate. Control system 105 may be housed in a housing at utility end 110 or vehicle end 120, or in a separate housing connected to charging cable 100. Alternatively, control system 105 may have modules housed in different housings connected to charging cable 100, and communicatively coupled as appropriate.

In one exemplary embodiment, charging cable 100 has a utility connector 112 and a ground fault current interrupt (GFCI) device 114 in utility end 110. Utility connector 112 is configured to connect to utility power socket 172 (FIG. 1). Utility power socket 172 may be configured as any type of power socket such as 110 volt, or 220 volt. Utility connector 112 may be configured to connect to a standard type of power socket or may be configured to accept adaptors for connecting to more than one type of power socket. In one embodiment utility end 110 contains measurement module 106 that detects the voltage level available at the power socket. Charging cable 100 may be used with power sockets configured to deliver 110 vac or 220 vac, as well as other voltages, such as any wall voltage available in the United States of America or internationally.

Control module 102 may be a module implemented on a circuit board, and may be implemented with a processor. In an exemplary embodiment control module 102 determines a charging schedule for a vehicle battery based on a voltage level of the utility voltage, the vehicle battery level, utility power rates, and a rate of charge. Other factors may be used to determine a charging schedule for a vehicle battery including a projected time to achieve a full charge. The information used to determine the charging schedule may be stored in data module 104. Control module 102 in the exemplary embodiment obtains utility data from the utility company or other utility supply source, and also obtains vehicle data from the vehicle.

In the exemplary embodiment, utility data includes utility rates including the cost of electricity based on a schedule that may include changes in utility rates based on many different factors such as time of day, time of year, peak demand use for an area or a household, and peak demand use for the utility company. Utility data may also include information received from the utility company regarding the present condition of a power grid where charging cable 100 is connected. Vehicle data, in the exemplary embodiment, includes the vehicle battery level, and other information related to the vehicle battery, and the vehicle. Control module 102 may use vehicle data, utility data, and other data such as information from measurement module 106 to determine a charging schedule with a lower cost for charging. In an alternative embodiment, control module 102 may determine a charging schedule based on utility peak usage and demand, and may regularly update the charging schedule based on new data received related to the peak usage and demand from the utility power source.

Control module 102 in the exemplary embodiment, is communicatively coupled to direct electric coupling 160 to control current delivered to vehicle charging system 14. In one embodiment electric coupling 160 is a switch that connects utility power between the ends of charging cable 100 and allows current to flow for charging vehicle battery 16. Electric coupling control device 160 may be any type of switch such as a relay or a transistor that is controlled by control module 102. In one embodiment, electric coupling 160 controls the current passing thorough charging cable 100, and may include a current limiting switch or other device to control current.

Data module 104 is any module configured to store data. In the exemplary embodiment data module is implemented as random access memory. Various types of memory may be used for data module 104 such as random access memory, flash memory, read-only memory, drum memory, magnetic core memory, bubble memory, twistor memory, and/or other types of magnetic or non-magnetic storage.

Measurement module 106 is any hardware and/or software module with the ability to measure electrical characteristics of power present at the utility power socket 172 and power flowing through charging cable 100. In an exemplary embodiment measurement module 106 includes circuits for measuring the voltage level of AC power at utility power socket 172 such as a voltage meter or a voltage comparator circuit, and also includes circuits for measuring current flowing through charging cable 100 to vehicle 10, such as a current meter. Data related to measured values are stored in data module 104. In one embodiment control module 102 uses the value of the utility voltage level and the value of the current passing through charging cable 100 to calculate energy used for charging vehicle battery 16, such as the total watts or kilowatts used. Control module 102 may also calculate a cost of energy used based on the utility rates, such as the cost of kilowatts/hour to determine the average cost for charging the vehicle. In one embodiment data module also receives mileage information from vehicle 10 and calculates a cost per mile of charging vehicle battery 16.

Communication module 130 is any device configured to send and/or receive data. In one embodiment communication module 130 is a device configured to send and receive signals wirelessly using a standard for wireless communication such as any of various IEEE standards or other standards. In other embodiments communication module 130 is a device configured to send data over a wired connection such as the power cable, a network cable, or other data cables. Communication module 130 may use devices to connect to a network, such as a personal area network, a home area network, a wide area network, and/or other networks. In one embodiment communication module 130 transfers data to a vehicle communication device on vehicle 10, such as an RF transmitter/receiver, that sends data over a network. Communication module 130 may send data over a network to the utility source, such as energy usage data. Communication module 130, in one embodiment, sends and receives data at the same time in a full duplex mode. In other embodiments, communication module 130 sends and receives data in half duplex mode. In an alternative embodiment, communication module 130 sends data over a network to a processor that determines a charging schedule for vehicle battery 16, and transmits the charging schedule to communication module 130 as utility data. Communication module 130 may be used to transmit and receive data over a network to facilitate a user interface. A user may receive information regarding energy usage of vehicle 10 and provide input for adjusting the charging schedule.

In the embodiment shown in FIG. 2 a user interface may be part of control system 105 including a display device 140 and a user input device 150. Display 140 is any device that communicates information in a visual format. In one embodiment, for example, display 140 may be a LCD panel that is capable of displaying various characters as directed by control module 102. User input device 150 is any device that allows a user to input data into control system 105.

Figure 3:
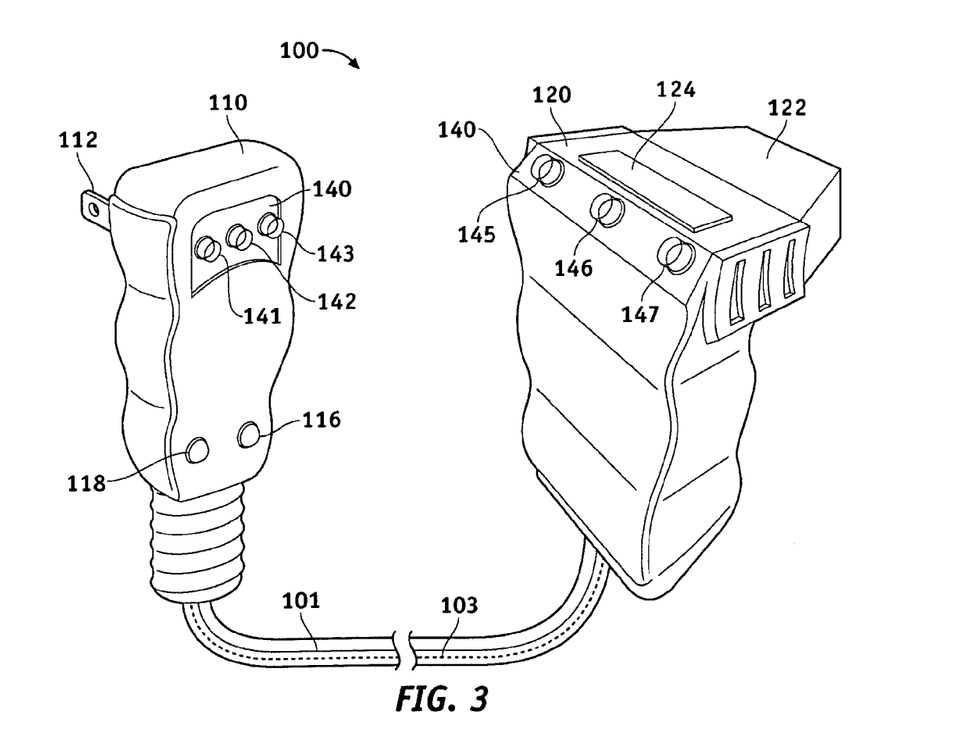
FIG. 3 is a perspective view of an exemplary charging cable.

In the embodiment shown in FIG. 3, a user interface includes display 140 including light emitting diodes (LEDs) 141-147, and user input device 150 including an override button 124. A power cable 101 and a communication cable 103 may be coupled between utility end 110 and vehicle end 120. In the exemplary embodiment charging cable 100 includes a display device in the form of light emitting diodes at both ends of charging cable 100. Other display devices may be used in one or both ends of charging cable 100, as well as in other housings connected to charging cable 100. Utility end 110 may include various diodes to indicate different conditions. A first LED 141, for example, may indicate whether power is present at the utility power socket 172. A second LED 142 may indicate if a proper ground circuit is detected in utility power socket 172, and a third LED 143 may indicate the status of the charging schedule. Other embodiments may indicate any other type of information in any manner.

In exemplary embodiments, where light emitting diodes are used the LEDs may indicate status by emitting light with changing colors, emitting light as a steady light, emitting light as a blinking light, and/or emitting light at various levels of brightness. In the exemplary embodiment, first LED 141 and second LED 142 emit a steady light to indicate that proper electrical connections are detected at utility power socket 172, and are off to indicate that such electrical connections are not detected. In one embodiment when power is detected at utility power socket 172 and an improper ground connection is detected, second LED 142 displays a blinking light to indicate the improper ground connection. Third LED 143, in the exemplary embodiment, indicates that the vehicle battery 16 is currently charging with a blinking green light, and indicates that the charge is complete with a steady green light. Third LED 143 may emit a blinking amber light to indicate when charging is delayed based on the charging schedule. In other embodiments LEDs and other display devices may indicate conditions and status using other methods and structures.

In the exemplary embodiment, vehicle end 120 of charging cable 100 includes three LEDs (fourth LED 145, fifth LED 146, and sixth LED 147) that indicate the same status in the same manner as first, second and third LEDs. Displays may be placed at both ends of the cable to indicate the same status information at two locations. Other displays may indicate the same information or different information at one or more locations.

Charging cable 100, in an exemplary embodiment, includes safety devices, such as a ground fault current interrupt (GFCI) circuit. A GFCI circuit may be housed in utility end 110, and may include a GFCI test button 116 and a GFCI reset button 118. The GFCI circuit compares the current on the AC lines. An imbalance between the AC lines indicates a ground fault and the circuit is opened, such as when a short to ground occurs.

Charging cable 100 may include a user input device, such as override button 124. Override button 124 is used to override a charging delay. In one embodiment, when a user connects vehicle end 120 with vehicle connector 122 to charging port 12 (FIG. 1) for charging vehicle battery 16, control system 105 (FIG. 2) may determine if proper connections are made with utility power through utility power socket 172 (FIG. 1), and with vehicle charging system 14. Control module 102 (FIG. 2) may then send signals to display 140 to indicate status of the electrical connections. Control module 102 may determine, based on a charging schedule, that a delay in charging would have an advantageous cost benefit. Control module 102, in this example then sends a signal to display 140 to indicate that charging is delayed. If the user does not want to delay charging, but wants to override the delay and begin charging immediately, the user may press override button 124. Control module 102 will then receive a signal from override button 124 and send a signal to electric coupling device 160 (FIG. 2) to begin charging. Control module 102 may also send a signal to display 140 to indicate that vehicle battery 16 is currently charging. In other embodiments other user input devices may be used such as a touch screen, multiple buttons, dials, switches, and/or keys. In one embodiment, as shown in FIG. 4, a user input device may be a computer 180 connected to communication module 130 through a network 200.

Figure 4:
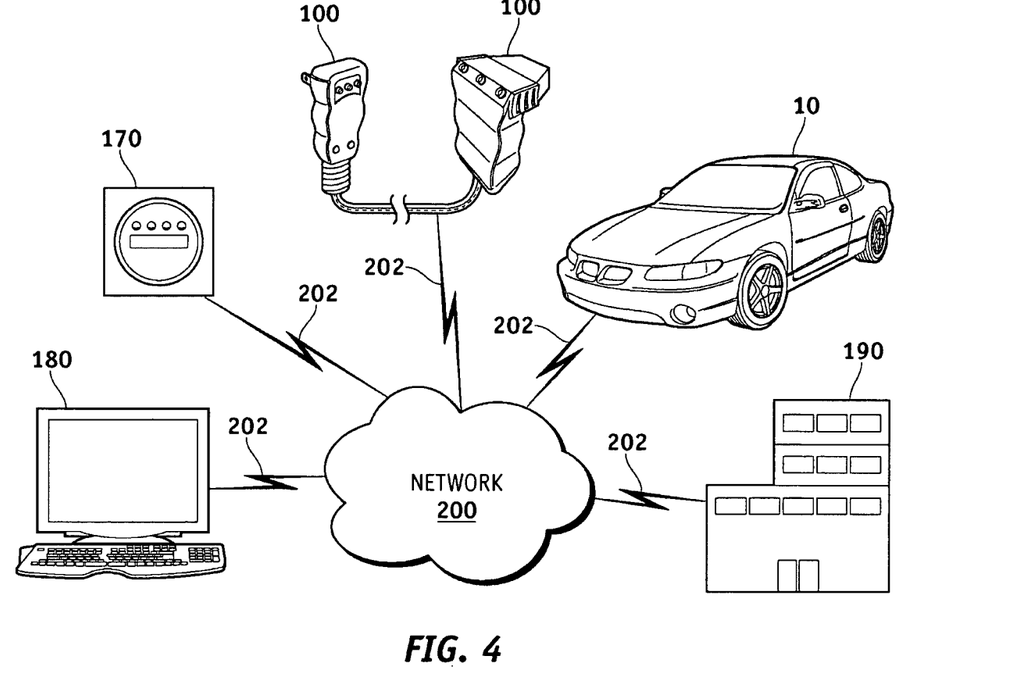
FIG. 4 is a diagram illustrating an exemplary charging cable as part of a network.

FIG. 4 shows charging cable 100 connected to network 200 through a communication link 202. Utility power source 170, computer 180, vehicle 10, and/or power company 190 may also be connected to charging cable 100 through communication links 202 connected to network 200. Other devices may also connect to charging cable 100 through network 200, such as a home energy management system. Network 200 may be one network as shown in the exemplary embodiment of FIG. 4. Alternatively, Network 200, may be multiple networks. Devices connected to network 200 may have additional communication links 202 between devices, or less communication links 202, than those shown in FIG. 4.

Utility power source 170 is any part of a power supply system that can send and/or receive information. In one embodiment utility power source 170 is a power meter that receives and relays information about the state of the electrical grid. In another embodiment, utility power source 170 is a centralized control for a part of the power grid. Utility power source 170 may exchange information with charging cable 100 for different purposes. In one embodiment, for example, utility power source 170 receives usage data related to the power used to charge vehicle battery 16, (FIG. 1) and formats the information for display to the customer. Communication with charging cable 100 may also be used to manage power usage and peak power usage over the grid. Utility power source 170, for example, may detect a condition of the power grid at or near output capacity, and may communicate with charging cable 100 to delay charging of vehicle battery, or reduce the current delivered to vehicle battery 16, to reduce the present power load on the grid. Utility power source 170, may receive information related to the present charging schedule, including a projected completion time, and adjust the charging schedule to manage the load on the power grid. Utility power source 170, may communicate with charging cable 100 through communication module 130 for other reasons and for other functions.

In one embodiment charging cable 100 receives information related to a current geographic location of charging cable 100 and vehicle 10. The current geographic location may be received through network 200, or through communication with a device in vehicle 10 such as a GPS receiver or other wireless receiver. The current geographic location may be used to determine which power company 190 is supplying power, and the rate structure of power company 190. In an alternative embodiment, charging cable 100 determines the current geographic location based on the network connection of network 200. Charging cable 110, for example, may connect using one network connection to a home area network when vehicle 10 is charged at a home location, and may connect to another network connection when charging vehicle 10 at an office location. In the exemplary embodiment, charging cable 100 includes remote charging settings for charging vehicle 10 when no current geographic location information is received when charging vehicle 10. Charging cable 100 may also store remote charging information from charging at a remote location, and may transmit the remote charging information to utility company for billing purposes. This may facilitate the involved utility company billing the vehicle owner regardless of the charging location and/or grid.

In one embodiment charging cable 100 facilitates management of the peak power load on the electrical grid by varying the start time of charging. This may be useful if many different vehicles or other electrical devices are set to automatically start drawing power when utility rates change, thus creating a power surge when utility rates change. Charging cable 100, for example, may include a random number generator to delay the start of charging from the beginning of the reduced utility rates, while still allowing full charge of vehicle battery with reduced utility rates. In the exemplary embodiment, if a significant portion of devices employ a random delay then the load surge may be reduced. Alternatively, load management may be accomplished by communication with power company 190, or another control source for utility power source 170 with commands to reduce or delay charging of vehicle 10 at specified times.

Computer 180 is any computer that may be operated by a person. In one embodiment, computer 180 communicates with charging cable 100 to adjust the charging schedule. If a user, for example, wants to vary a regular charging schedule so that charging would be complete at different times on different days, one embodiment may allow the user to adjust the schedule using computer 180. Charging cable 100 may gather data, such as utility data and vehicle data, and transmit the data to computer 180 for display to the user.

Power company 190 is any company that supplies power used for charging vehicle battery 16. Power company 190 may communicate with charging cable 100 and may receive data from charging cable 100 to be used for billing purposes or other purposes. In one embodiment power company 190 transmits utility rate information through network 200. The utility rate information is received by charging cable 100 for use in a charging schedule.

Figure 5:
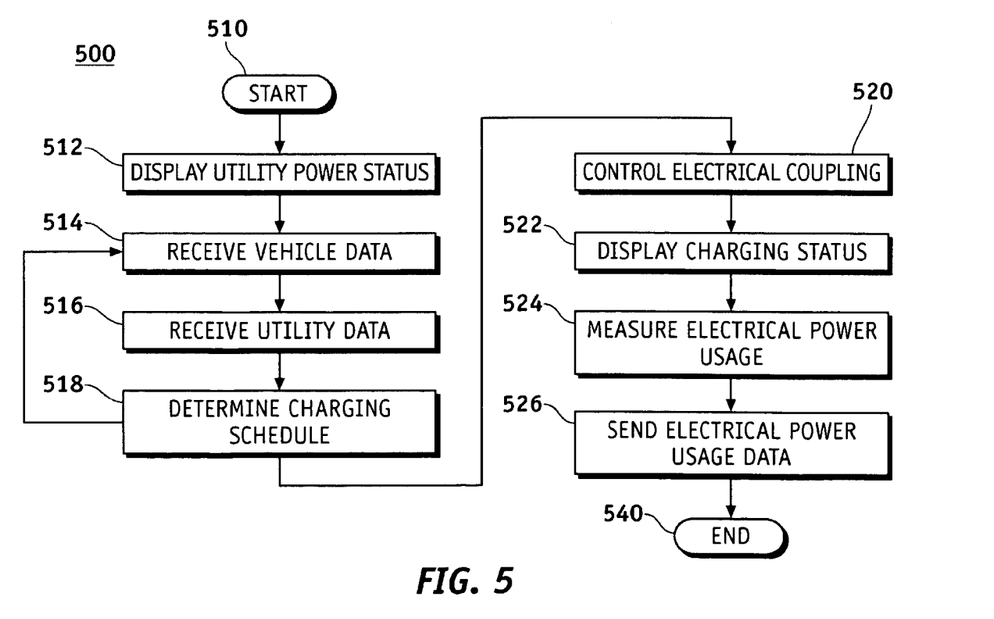
FIG. 5 is a flow chart of an exemplary method of charging a vehicle.

FIG. 5 shows a flow chart according to an exemplary method 500 of charging a vehicle battery. The exemplary method 500 starts at step 510. In the exemplary embodiment, when utility connector 112 (FIG. 2) is connected to utility power socket 172 (FIG. 1), charging cable 100 displays utility power status (step 512). Utility status may be display at one or more location, such as at vehicle end 120 and utility end 110 (FIG. 3). With the utility status displayed, a user may quickly determine whether the utility power is available for charging vehicle battery 16 (FIG. 1). The charging cable may be connected to charging port 12 before or after connecting to utility power source 170.

In exemplary method 500, after power is properly connected to charging cable 100, the charging cable may be connected with vehicle connector 122 connected to charging port 12 on vehicle 10 (FIG. 1). In the exemplary embodiment, connecting vehicle connector 122 to vehicle 10 establishes a communication coupling between vehicle 10 and control module 102 (FIG. 2). In other embodiments communication with vehicle 10 is established using wireless communication. In the exemplary embodiment, with control module 102 communicatively coupled to vehicle 10, control module 102 receives vehicle data (step 514). Vehicle data may be stored in data module 104 (FIG. 2), and may include state of charge information for vehicle battery 16, as well as other data.

In step 516 as shown in exemplary method 500 of FIG. 5, control module 102 receives utility data. The utility data may include a utility rate schedule that has different rates for electricity usage at different times. For example, utility rates may be lower during the night time, such as from 9:00 PM to 7:00 AM. The utility rates may change based on many factors. In one embodiment utility data also includes information regarding peak load on the power grid. Utility data may be received from power company 190 (FIG. 4) through any method of data communication, such as the internet, or through a telephone system including a cell phone network. Charging cable 100, in the exemplary embodiment, stores the utility data in data module 104 (FIG. 2).

In the exemplary embodiment, control module 102 (FIG. 2) determines a charging schedule (step 518) based on the vehicle data and utility data. In the exemplary method 500 shown in FIG. 5, charging cable 100 continues to receive vehicle data and utility data, and continues to update charging schedule in step 518. In one embodiment the vehicle data is used to estimate the power needed to fully charge vehicle battery 16. Utility data may include the voltage level available at utility power socket 172 and the maximum amperage for current delivered to vehicle battery. In the exemplary embodiment the voltage level available and the maximum amperage are used to calculate a maximum rate of charging, and the estimated power needed is used with the maximum rate of charging to determine an estimated minimum charging time. A charge completion time may be determined by default, such as the time when the utility rates change from a low cost to a higher cost, or may be received as input from a user. The charge completion time, together with the estimated minimum charging time, is used in the exemplary embodiment to determine when charging begins. Charging may begin prior to the start of reduced utility rates if, for example, the estimated charging time is longer than the time period with lower utility rates. In other embodiments other factors are used to determine and update the charging schedule such as user input that may be received through network 200 (FIG. 4), or through user input device 150 (FIG. 2). In one embodiment, the charging schedule is disregarded if a user provides input to override the charging schedule, so that charging begins at the highest rate of power available regardless of costs or other factors. Charge complete time may also be determined based on battery State of Charge (SOC).

In exemplary method 500, control module 102 uses the charging schedule to determine when to connect charging system 14 (FIG. 1) in vehicle 10 to utility power supply 170. Control module 102 (FIG. 2) controls electrical coupling 160 (step 520) based on the charging schedule for a reduced cost of charging vehicle battery 16. Exemplary method 500 allows a vehicle user to connect charging cable 100 to vehicle 10 at any time prior to when the lower utility rates are available, and still have the benefits of a lower cost of charging. For example, an operator of vehicle 10 may arrive at home, or at another location with utility power socket 172, and connect charging cable 100 to utility power socket 172 and vehicle port 12 at 5:00 PM. Charging cable 100, in this example, then receives vehicle data including the state of charge of the vehicle battery 16, and also receives local utility rates and determines a charging schedule. The charging schedule may estimate that six hours are needed to fully charge vehicle battery 16, and may connect vehicle charging system 14 to utility power supply 170 at 9:00 PM when utility rates are reduced. In this example charging would continue until charging system 14 indicated that charging was complete, which may occur around 3:00 AM.

In the exemplary method 500, control module 102 (FIG. 2) uses display 140 to display charging status (step 522). Display 140 in the exemplary embodiment provides feedback to a user regarding the charging schedule, and whether the vehicle battery 16 is currently charging or is delayed. If the charging is delayed and the user does not desire a delay, the user may indicate through a user input that charging should begin. The charging schedule will then be updated, and charging can begin.

Charging cable 100 (FIG. 2) in the exemplary embodiment also has a measurement module 106, and measures electrical power usage (step 524). The measured electrical power usage may be stored as data in data module 104. In the exemplary embodiment, data including electrical power usage data is sent over a network (step 526) to power company 190 (FIG. 4). In other embodiments data is sent to vehicle 10 and to computer 180 for display, and/or feedback control. The exemplary method 500 ends at 540. The exemplary method 500 shown in FIG. 5 is one embodiment of a method of charging a vehicle battery. Other methods, however, may include additional steps, or fewer steps. The order and implementation of method steps may also be modified.

In various embodiments charging cable 100 may be produced with a power cable 101 (FIG. 3) integrally connected to a control module and/or other modules. In other embodiments a control module and/or other modules may be produced separately from power cable 101 and connected to utility end 110 and/or vehicle end 120. Control system 105 (FIG. 2), for example, may be housed in a module connected between vehicle connector 122 and charging port 12 (FIG. 1), and/or in a module connected between utility connector 112 (FIG. 2) and utility power source 170 (FIG. 1).

Exemplary method 500 of charging a vehicle battery and exemplary embodiment of charging cable 100 may provide advantages and improvements over prior charging cables and charging methods in various ways. In one embodiment charging cable 100 provides a consumer with a convenient system for lowering the cost of charging an electric vehicle. In another embodiment charging cable 100 provides the ability for a power company to manage load balance. One embodiment of charging cable 100 provides ability for both the consumer and the power company to receive feedback regarding power usage for an electric vehicle.

The foregoing description refers to elements or nodes or features being "connected" or "coupled" together. As used herein, unless expressly stated otherwise, "connected" means that one element/node/feature is directly joined to (or directly communicates with) another element, node or other feature in a mechanical, logical, electrical or other appropriate sense. Likewise, unless expressly stated otherwise, "coupled" means that one element/node/feature is either directly or indirectly joined to (or directly or indirectly communicates with) another element/node/feature in a mechanical, logical, electrical or other appropriate sense. The term "exemplary" is used in the sense of "example," rather than "model." Further, although the figures may depict example arrangements of elements, additional intervening elements, devices, features, or components may be present in a practical embodiment.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A charging cable configured to electrically couple a vehicle battery to a utility power source comprising:
    a vehicle connector configured to connect to a charging port on a vehicle;
    a data module configured to receive utility data from the utility power source and to receive vehicle data from the vehicle; and
    a control module communicatively coupled to the data module, the control module configured to connect the utility power source to the charging port based on both the utility data and the vehicle data;
    wherein:
        the utility data includes utility rates including a cost of electricity based on a utility rate schedule that includes different rates based on each of the following: a time of day, a time of year, and peak electricity demand;
        the vehicle data includes a vehicle battery level; and
        the control module is configured to connect the utility source to the charging port based on the vehicle battery level as well as a re-charging cost based on the utility rate schedule in combination with each of the following: the time of day, the time of year, and the peak electricity demand.

2. The charging cable according to claim 1 further comprising a communication module communicatively coupled to the data module, the communication module configured to send and receive the utility data and the vehicle data over a network.

3. The charging cable according to claim 1 the control module further comprising a processor that determines a charging schedule based on the utility data and the vehicle data.

4. The charging cable according to claim 1 further comprising a user interface configured to display a charging status of the vehicle battery, and configured to accept user input.

5. The charging cable according to claim 1 further comprising a charging status indicator configured to display a charging status.

6. The charging cable according to claim 1 further comprising a utility power status indicator configured to display a utility power status.

7. The charging cable according to claim 6 wherein the utility power status comprises power connection status and ground connection status.

8. A vehicle charging cable comprising:
    a data communication system configured to communicate with a home area network and configured to communicate with a vehicle;
    a control system comprising:
    a data module communicatively coupled to the data communication system, the data module configured to retain utility rate data, and power usage information,
    wherein:
        the utility data includes utility rates including a cost of electricity based on a utility rate schedule that includes different rates based on each of the following: a time of day, a time of year, and peak electricity demand; and a control module communicatively coupled to the data module and configured to connect a utility power source and a charging port, wherein the control module calculates a charging schedule based on both the utility rate data and the power usage information, and specifically based on the power usage information and a re-charging cost based on the utility rate schedule in combination with each of the following: the time of day, the time of year, and the peak electricity demand; and a user interface configured to display charging status of the vehicle battery, and configured to accept user input.

9. The vehicle charging cable according to claim 8 wherein the control system further comprises a measurement module communicatively coupled to the data module, the measurement module configured to measure electrical power usage and to produce usage data, wherein the usage data is stored in the data module.

10. The vehicle charging cable according to claim 9, the measurement module comprising a current meter configured to measure electrical current passing through the vehicle charging cable.

11. A device comprising:
a vehicle connector connected to a power cable configured to supply power for charging a vehicle battery, wherein the vehicle connector is configured to connect to a vehicle with a charging port; and
a control module connected to the power cable wherein the control module is configured to receive utility data from a utility power source and to receive vehicle data from the vehicle, and to connect power supplied to the vehicle battery based on both the utility data and the vehicle data, wherein:
the utility data includes utility rates including a cost of electricity based on a utility rate schedule that includes different rates based on each of the following: a time of day, a time of year, and peak electricity demand;
the vehicle data includes a vehicle battery level; and
the control module is configured to connect the utility source to the charging port based on the vehicle battery level and a re-charging cost based on the utility rate schedule in combination with each of the following: the time of day, the time of year, and the peak electricity demand.

12. The device according to claim 11 further comprising a utility connector connected to the power cable, wherein the utility connector is configured to connect to a utility power socket.

13. The device according to claim 11 wherein the power cable comprises a utility end and a vehicle end, and wherein the control module comprises a first module at the utility end of the cable, and a second module at the vehicle end of the cable, the power cable further comprising a communication cable communicatively coupled to the first module and the second module.

14. The device according to claim 11 wherein the device comprises a transmitter communicatively coupled to the control module, wherein the transmitter is configured to transmit the vehicle data.

15. The device according to claim 11 wherein the device comprises a display communicatively coupled to the control module, wherein the display is configured to indicate a charging status of the vehicle battery.

16. The device according to claim 15 wherein the display comprises a light emitting diode.

17. The device according to claim 11 wherein the device comprises a user input device configured to transmit a user input signal to the control module, and wherein the control module is configured to further adjust the power supplied to the vehicle battery based on the user input signal from the user input device.

18. The charging cable of claim 1, further comprising:
a measurement module communicatively coupled to the data module, the measurement module configured to measure vehicle electrical power usage data for the vehicle, wherein the vehicle electrical power usage data is retained in the data module;
wherein the control module is configured to connect the utility source to the charging port based on the vehicle battery level, the vehicle electrical power usage data for the vehicle, and the re-charging cost based on the utility rate schedule in combination the vehicle electrical power usage data in addition to each of the following: the time of day, the time of year, and the peak electricity demand.

19. The charging cable of claim 18, wherein:
the data module is configured to receive electric grid power usage information for an electrical grid that is used to provide electrical power for the vehicle; and
the control module is configured to connect the utility source to the charging port based on the vehicle battery level, the vehicle electrical power usage data for the vehicle, the electrical grid power usage information for the electrical grid, and the re-charging cost based on the utility rate schedule in combination the vehicle electrical power usage data in addition to each of the following: the time of day, the time of year, and the peak electricity demand.

20. The charging cable of claim 19, wherein the control module is configured to delay charging of the vehicle battery, reduce an electrical current delivered to the vehicle battery, or both, to manage a present power load and a peak power load for the electrical grid.

* * * * *